United States Patent
Fan et al.

(10) Patent No.: US 8,681,232 B2
(45) Date of Patent: Mar. 25, 2014

(54) VISUAL CONTENT-AWARE AUTOMATIC CAMERA ADJUSTMENT

(75) Inventors: Quanfu Fan, Somerville, MA (US); Prasad Gabbur, Sleepy Hollow, NY (US); Sachiko Miyazawa, Bronx, NY (US); Sharathchandra Pankanti, Darien, CT (US); Hoang Trinh, Mt. Vernon, NY (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 13/218,845

(22) Filed: Aug. 26, 2011

(65) Prior Publication Data

US 2013/0050517 A1 Feb. 28, 2013

(51) Int. Cl.
| | |
|---|---|
| H04N 7/18 | (2006.01) |
| H04N 5/232 | (2006.01) |
| H04N 5/225 | (2006.01) |
| G06K 9/00 | (2006.01) |

(52) U.S. Cl.
USPC ..... 348/211.4; 348/77; 348/143; 348/207.11; 382/100

(58) Field of Classification Search
USPC ........ 348/77, 143, 150, 207.11, 211.4, 211.6, 348/222.1; 382/100, 103; 705/7.27, 7.28
See application file for complete search history.

(56) References Cited

U.S. PATENT DOCUMENTS

| | | | |
|---|---|---|---|
| 7,631,808 B2* | 12/2009 | Kundu et al. | 235/383 |
| 7,839,431 B2 | 11/2010 | Swarr et al. | |
| 8,478,048 B2* | 7/2013 | Ding et al. | 382/190 |
| 8,548,203 B2* | 10/2013 | Bobbitt et al. | 382/107 |
| 2005/0213796 A1* | 9/2005 | Ikoma et al. | 382/115 |
| 2009/0086022 A1 | 4/2009 | Finn et al. | |
| 2011/0191195 A1* | 8/2011 | Lipton et al. | 705/16 |
| 2012/0127316 A1* | 5/2012 | Kundu et al. | 348/150 |

OTHER PUBLICATIONS

Quanfu Fan et al, Recognition of Repetitive Sequential Human Activity, International Conference on Computer Vision and Pattern Recognition (CVPR), Jun. 2009, 9 pp.
Quanfu Fan et al, Detecting Sweethearting in Retail Surveillance Videos, International Conference on Acoustics, Speech, and Signal Processing (ICASSP), Apr. 2009, 4 pp.
Motilal Agrawal, Practical Camera Auto Calibration Using Semidefinite Programming, Proceedings IEEE Workshop on Motion and Video, 2007, pp. 1-6.
Thorsten Thormahlen et al, Robust Linear Auto-Calibration of a Moving Camera from Image Sequences, Proceedings of the 7th Asian Conference on Computer Vision (ACCV 2006), 10 pp.
Prasad Gabbur et al, A Pattern Discovery Approach to Retail Fraud Detection, Exploratory Computer Vision Group, IBM Research, 9 pp.
Richard Hartley et al, Multiple View Geometry in Computer Vision, Cambridge University Press, Chapter 19, "Auto-Calibration", pp. 458-501, 2003.

* cited by examiner

*Primary Examiner* — Daniel M Pasiewicz
(74) *Attorney, Agent, or Firm* — Patrick J. Daugherty; Driggs, Hogg, Daugherty & Del Zoppo Co., LPA

(57) ABSTRACT

Visual content in images captured from a scene by a camera in each of a plurality of different pose settings are analyzed to determine predicted occurrences of a transaction associated with the visual content in each pose, which are compared with actual transaction occurrence data to generate performance values for each pose as a function difference between the predicted and actual transactions. Optimized poses are chosen having the best performance value, wherein a camera controller may place the camera in the optimum pose for use in monitoring the scene and generating the primitives of interest associated with the transactions.

24 Claims, 4 Drawing Sheets

VISUAL CONTENT-AWARE AUTOMATIC CAMERA ADJUSTMENT

BACKGROUND

The present invention relates to the adjustment of image capturing equipment in response to the determination of image content.

In a variety of contexts there may be a desire to monitor events and activities for the occurrence or omission of certain activities, for example to comply with activity processes and policies. Compliance failures may result in injuries from failure to observe safety regulations or physical barriers, theft in business and retail establishments and other losses or loss exposures. Gaps in procedure may be identified for remedy, for example through retraining, by capturing and recording behavior deviations with video systems for subsequent or contemporaneous analysis. However, optimally configuring cameras and other image capturing equipment to provide images useful in monitoring scenes comprising activities of interest generally requires human review and analysis of each camera scene in order to identify necessary adjustments, for example to lighting, camera angle and positioning, lens depth of field or focus, etc. In applications with a large number of cameras this task may be very time consuming and error prone. Further, once adjusted, a camera may require further monitoring and readjustment, through being bumped out of alignment or through scene changes (for example, structures within the scene may be moved, resulting in movement of activities of interest out of present scene view).

BRIEF SUMMARY

In one embodiment of the present invention, a method for adjusting camera settings as a function of associated video analytics data output includes a processing unit analyzing visual content captured from a scene by a camera in an initial pose setting to determine a predicted occurrence of a transaction associated with the visual content, and comparing the predicted transaction occurrence to data of actual transactions associated with the visual content to generate a performance value for the initial pose as a function of a difference between the predicted transaction and an actual transaction in the data of actual occurrences. The method thus iteratively repeats for each of one or more different pose positions the analyzing of visual content captured from each scene by the camera in each pose setting to determine predicted occurrences of transactions associated with the visual content, and compares each predicted transaction occurrence to the data of actual transactions associated with the visual content to generate performance values for each of the poses as the function of differences between the predicted and actual transactions in the data. Thus, an optimized pose is chosen that has the best performance value, wherein a camera controller may place the camera in the optimum pose for use in monitoring the scene and generating the primitives of interest associated with the transactions.

In another embodiment, a system has a processing unit, computer readable memory and a computer readable storage medium device with program instructions, wherein the processing unit, when executing the stored program instructions, evaluates a camera pose by comparing transaction occurrences predicted through analysis of scene images acquired by the camera while in the pose to actual transaction data to generate a performance value for the pose as a function of a difference between the expected and predicted transaction data occurrences. The system further chooses an optimum pose from a plurality of iteratively analyzed poses that has a best performance value, and moves the camera into the optimum pose for use in monitoring the scene and generating primitive images of interest associated with the transactions.

In another embodiment, an article of manufacture has a computer readable storage medium device with computer readable program code embodied therewith, the computer readable program code comprising instructions that, when executed by a computer processor, cause the computer processor to evaluate a camera pose by comparing transaction occurrences predicted through analysis of scene images acquired by the camera while in the pose to actual transaction data to generate a performance value for the pose as a function of a difference between the expected and predicted transaction data occurrences. The computer processor further chooses an optimum pose from a plurality of iteratively analyzed poses that has a best performance value, and moves the camera into the optimum pose for use in monitoring the scene and generating primitive images of interest associated with the transactions.

In another embodiment, a method for providing a service for adjusting camera settings as a function of associated video analytics data output includes providing one or more articles, including a scene analyzer that evaluates a camera pose by comparing transaction occurrences predicted through analysis of scene images acquired by the camera while in the pose to actual transaction data to generate a performance value for the pose as a function of a difference between the expected and predicted transaction data occurrences. A camera pose selector is provided that chooses an optimum pose from a plurality of poses iteratively analyzed by the scene analyzer that has a best performance value, and wherein a camera controller may moves the camera into the optimum pose for use in monitoring the scene and generating primitive images of interest associated with the transactions.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
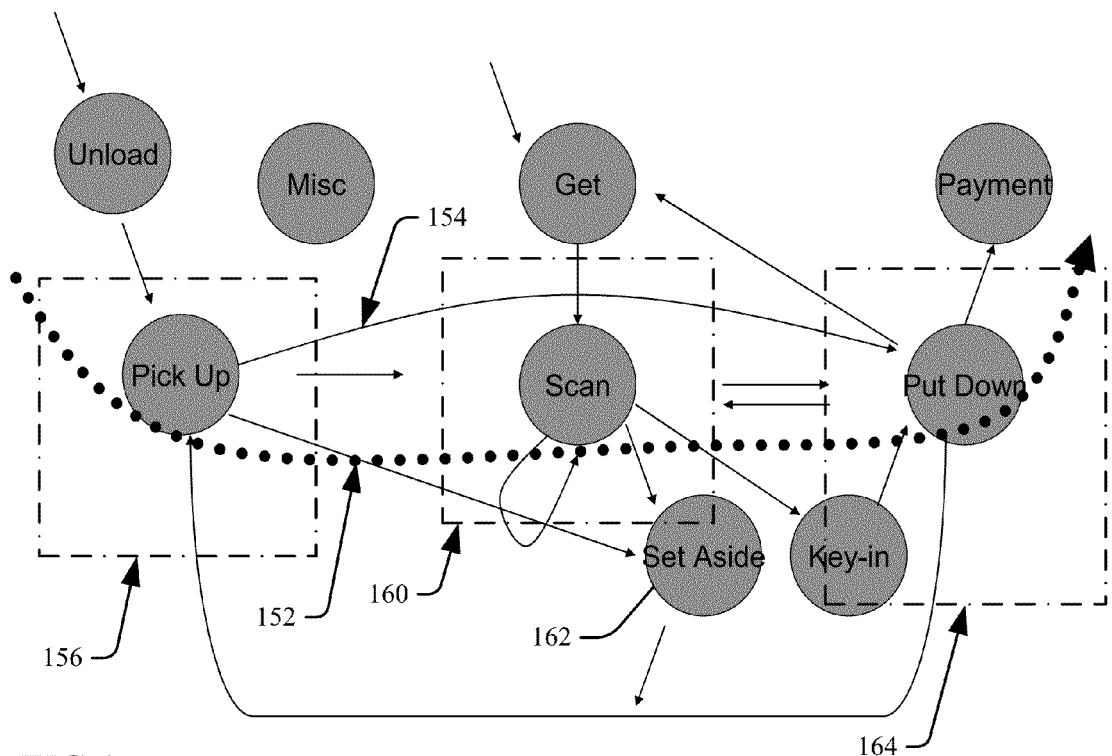
FIG. 1 illustrates an overhead perspective state diagram of possible human movements relative to scanning transactions according to one embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Compliance of human activity with policies, regulations, etc. may be enforced through direct human surveillance. For example, safety and security personnel may watch cameras trained on certain areas to discover deviations from safety policies, trespassing, theft, unauthorized access to restricted areas, etc. However, human visual attention may be ineffective, particularly for large volumes of video data. Due to many factors, illustratively including an infrequency of activities of interest, a fundamental tedium associated with the task and poor reliability in object tracking in environments with visual clutter and other distractions, human video surveillance may be both expensive and ineffective.

Automated video surveillance systems and methods are known wherein computers or other programmable devices directly analyze video data and attempt to determine the occurrence of activities of concern. For example, a major source of retail loss is intentional or unintentional failure of proper checking out of items at the point of sale (POS). Sweet-hearting or "fake scanning" describes the action of a cashier in intentionally failing to scan or otherwise enter an item into a retail transaction in order to provide the merchandise free of charge for a customer presenting the items for purchase, usually by moving the item from an input (pick-up) location through the processing (scan) area and into the output (drop or bagging) area by covering up the item bar code, stacking an item on top of another to occlude the scanner from reading the code or passing the item around the scan area during a scan motion to intentionally avoid a bar code reader in the scan area with respect to a bar code of the free item. In order to minimize such losses, automated visual compliance systems may be deployed for monitoring of checkout lanes for detecting non-compliant transactions, which employ various techniques for analyzing video streams along with Point-Of-Sale (POS) data.

FIG. 1 is a perspective state diagram of a camera aligned in an overhead viewpoint to capture a plurality of possible movements and actions 162 of a cashier in a retail context (for example, of a scanning lane) with respect to possible movement vectors 152, 154, and which include each of the pickup, scan and drop primitive images. (It will be understood that as used herein "cashier" is a generic term to denote a person scanning an item, and that embodiments contemplate that the scanning person may be a clerk or cashier as well as a customer, bagger, manager or other person.) Thus, in a simple scanning motion path vector 152 an item is picked-up from a pick-up area 156, scanned by passing the item within scanning range of a scanner in a scanning area 160 and then put down in a bagging or drop area 164. Examples of the pick-up areas 156 include an intake belt, a counter, a shopping basket and a cart, and the put-down area 164 may be one or more of a distribution belt, counter, shopping basket or shopping cart, each of which may entail different motions. The vectors 154 each represent an observed motion relative to other actions 162 of a cashier and observable in a video feed, illustratively including unloading items, and getting and scanning loyalty cards, supervisor/assistant override cards, coupons or other bar-code cards.

Video analytics systems may be used to analyze video data taken from the scene depicted in FIG. 1. Some examples model a checkout transaction event (for example, an item purchase, a loyalty card scan, etc.) as comprising one or more discrete, distinct event or sub-event primitive images acquired from the video stream of images of the checkout scene, often associated through a temporal ordering. A common item purchase transaction may thus be expected to be associated with three primitive images in sequential order: a first Pickup (P) image of an item being picked up from the pickup area 156, followed by a Scan (S) image of the item seen passing through the barcode scanner area 160, which is in turn followed by a Drop (D) image of the same item being dropped off on to the drop area 164.

As will be appreciated by one skilled in the art, other image visual content input provided by one or more cameras may be analyzed to recognize and generate such individual primitive images parsed from video stream input data through a variety of methods and systems. For example, an efficient vision technique may detect Pickup (P), Scan (S), and Drop (D) and other primitives from an input retail video stream based on an observation that the cashier's hand enters and exits one or more of the different pick-up area 156, scan area 160 and drop-off area 164 regions of interest (ROI) of FIG. 1, and further sometimes with specific, distinctive motion patterns. Thus, a hand color model may be adaptively learned to detect hand motion by continuously collecting hand pixel examples, and based on the model each pixel in a motion map computed by frame differencing is classified as hand pixel or not, to form a hand motion map for each video frame. Such mapping may explicitly capture hand motion robustly in the presence of motion noise from belt movement, background changes, and customer interactions. A hierarchical Finite State Machine (FSM) may be also applied to deterministically check whether or not the hand motion follows the predefined in/out pattern corresponding to each primitive. Further, after the primitives P, S, D are detected through such pattern recognitions, they may be labeled and combined, optionally with the labeled non-visual data associated with the activities captured, for example with barcode labels (B) from each barcode event found in transaction log data generated by the scanner 160 and associated by time with the generated image, to thereby form a temporally-ordered text string of labels {P, S, D, B} appropriate for analysis for transaction determinations.

Figure 2:
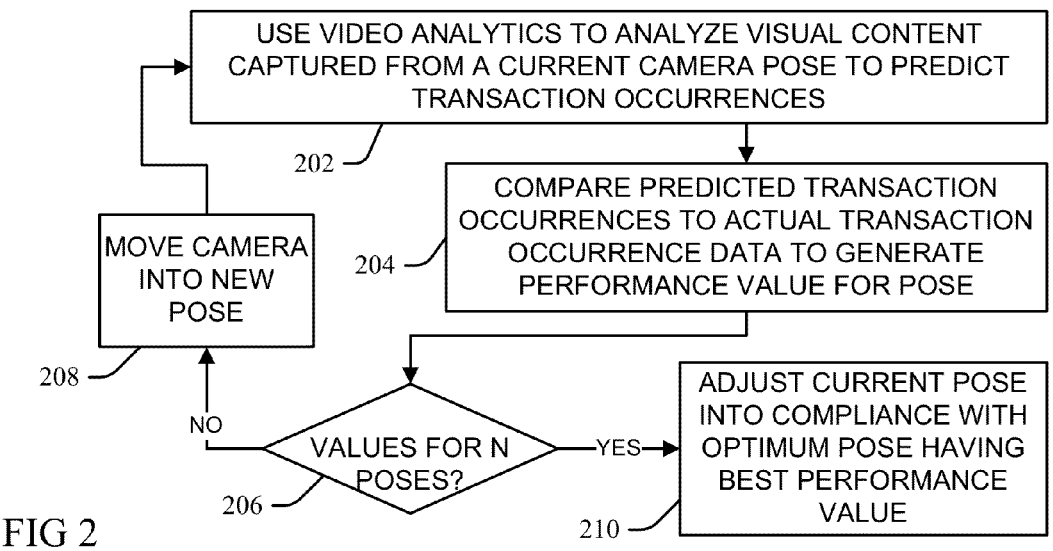
FIG. 2 is a block diagram illustration of an embodiment of a method or system for adjusting camera settings as a function of associated video analytics data output according to the present invention.

Using cameras to acquire desired primitive images generally involves two tasks: (i) identifying the scene area (or areas) of interest relative to the desired image primitives for each camera; and (ii) setting up each camera in such a way that it can optimally monitor at least one of the ROI of interest of the scene (for example, one or more of areas 156, 160 and 164 of FIG. 1). Embodiments of the present invention utilize the image data generated by the video analytics system from images acquired from a camera to adjust the cameras in order to optimize the performance of the video analytics system, generally as a function of the relation of primitive generation to non-visual transaction data. More particularly, FIG. 2 illustrates one embodiment of a process or system for adjusting camera settings as a function of associated video analytics data output according to the present invention. At 202 visual content captured by a camera in an initial pose setting is analyzed through a video analytics process or system to determine predicted transaction occurrences. The pose setting may be represented by a panning angle and a zoom or scale factor, though other parameters may be used. Thus, in an example adapted for the retail barcode scanner example of FIG. 1, the analytics detects a plurality of the primitives P, S, D, and at 202 uses their temporal relationships to each other to predict the occurrences of bar code entries (B) in a transaction log reflecting scan events indicated by the primitives and that should be generated by the scanner 160. At 204 the predicted transaction occurrences are compared to actual transaction data to generate a performance value for the initial pose as a function of a difference between the expected and predicted transaction data occurrences. Thus, in the present example, predicted bar code occurrences are compared to the bar code entries in the actual point-of-sale (POS) transaction log data generated by the scanner 160 to generate a performance value for the current (initial) pose as a function of a difference between the expected and predicted bar code occurrences.

At 206/208 the process is iteratively repeated for one or more different pose positions (with N being the total number of poses) to generate different performance values for each of the N different camera poses as functions of differences between expected and predicted transaction data occurrences. Accordingly, at 210 an optimum pose is chosen from the different camera poses that has the best performance value, and wherein a camera controller may thus place the camera in this optimum position for use in monitoring the scene and generating the primitives of interest associated with the transactions.

Figure 3:
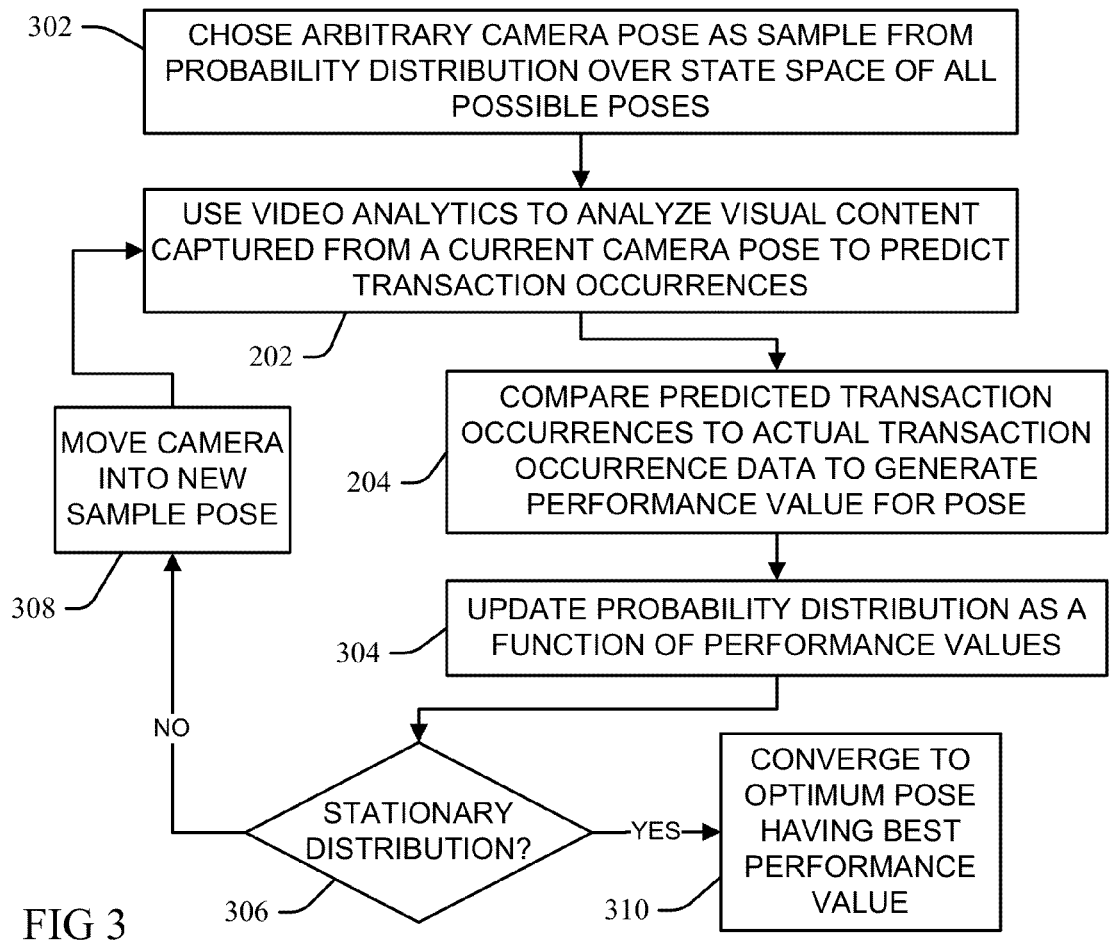
FIG. 3 is a block diagram illustration of an unsupervised embodiment of a method or system for adjusting camera settings as a function of associated video analytics data output according to the present invention.

Some embodiments of the system or process of FIG. 2 may be unsupervised, without requiring any human supervision or intervention. FIG. 3 illustrates one such unsupervised embodiment wherein random sampling may be used to seek the optimal camera pose, and more particularly at 302 an arbitrary camera pose is considered as the initial pose as a sample drawn from a proposal probability distribution over a state space of all possible camera poses. This distribution can be approximated by a sufficient number of weighted samples, for example by using a non-parametric density estimation technique, and wherein the weight of each sample may be obtained by computing the objective function with that sample. Thus, the image data from the camera is processed by the video analytics and used to predict transaction occurrences at 202, which are compared to the actual transaction data at 204 to generate a performance value for the initial pose as discussed above.

With each new sample collected the proposal distribution is updated as a function of the performance values at 304, and the process repeats iteratively through different samples at 306/308 until reaching a stationary distribution in an iterative stochastic process, to thereby approximately converge to the optimum pose at 310.

In one embodiment for a state space of camera poses, each pose sample is a four-dimensional (4D) vector v=(S, Tx, Ty, Alpha). Given some camera pose v, an objective function (F(v)) generates a performance value for each pose as the difference between transaction occurrences predicted by the video analytics from the image data acquired at that pose ($L_{CASE}(v)$) and the actual occurrence reflected in the transaction data ($L_{POS}$):

$$F(v) = \|L_{CASE}(v) - L_{POS}\|. \quad [1]$$

Thus, for each single iteration updating the distribution at 304 comprises drawing samples from a current proposal distribution (including as updated by previous iterations), updating the importance weights up to a normalizing constant using the objective function [1], creating a new set of samples using their weights, setting the weights of samples to uniform and updating the proposal distribution. In this fashion, embodiments of the present invention may derive a new configuration for the camera based on the statistics of the final distribution (for example, mean, mode, etc.). In one aspect, iteratively performing random sampling from a distribution of all possible camera poses by perturbing the camera parameters helps the system gradually approach the optimal performance.

Figure 4:
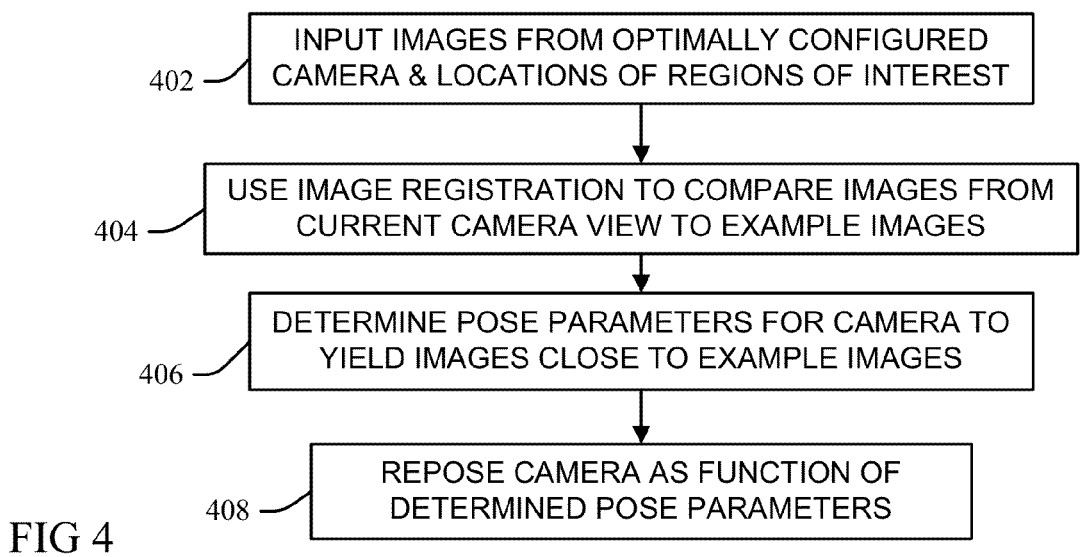
FIG. 4 is a block diagram illustration of an unsupervised embodiment of a method or system for adjusting camera settings as a function of associated video analytics data output according to the present invention.

Some embodiments may use a partial human intervention in a semi-supervised learning process to indentify an optimum camera pose, wherein human domain knowledge about the environment in which the video surveillance system operates is used as input to define an expected optimal pose. Referring now to FIG. 4, in one semi-supervised approach embodiment a human knowledge input at 402 comprises example images captured by an optimally configured camera, along with the locations of all the regions of interest (ROI) for the surveillance application (for example, the pick-up, scan and drops areas 156, 160 and 164 of FIG. 1). Given a new camera, an image registration technique at 404 compares the example images to images from the new camera to find pose parameters for the new camera at 406 which yield an image as close to the optimal examples as possible, wherein the obtained camera parameters may be applied to repose the new camera at 408 using remote camera tuning commands.

For example, an embodiment of the system and process of FIG. 4 adapted for the retail context of FIG. 1 may assume that checkout lanes of the same type at the same store have identical or very similar layouts, subject to some linear or affine 2D transformation (also sometimes referred to as an affine map or affinity between two vector spaces). Thus, for each new camera image, the process/system may use image registration at 404 to find a transformation matrix at 406 between the new and optimal example images, which is factorized into a chain of transformations to apply to repose the new camera at 408 in scaling, translation and rotation operations.

Figure 5:
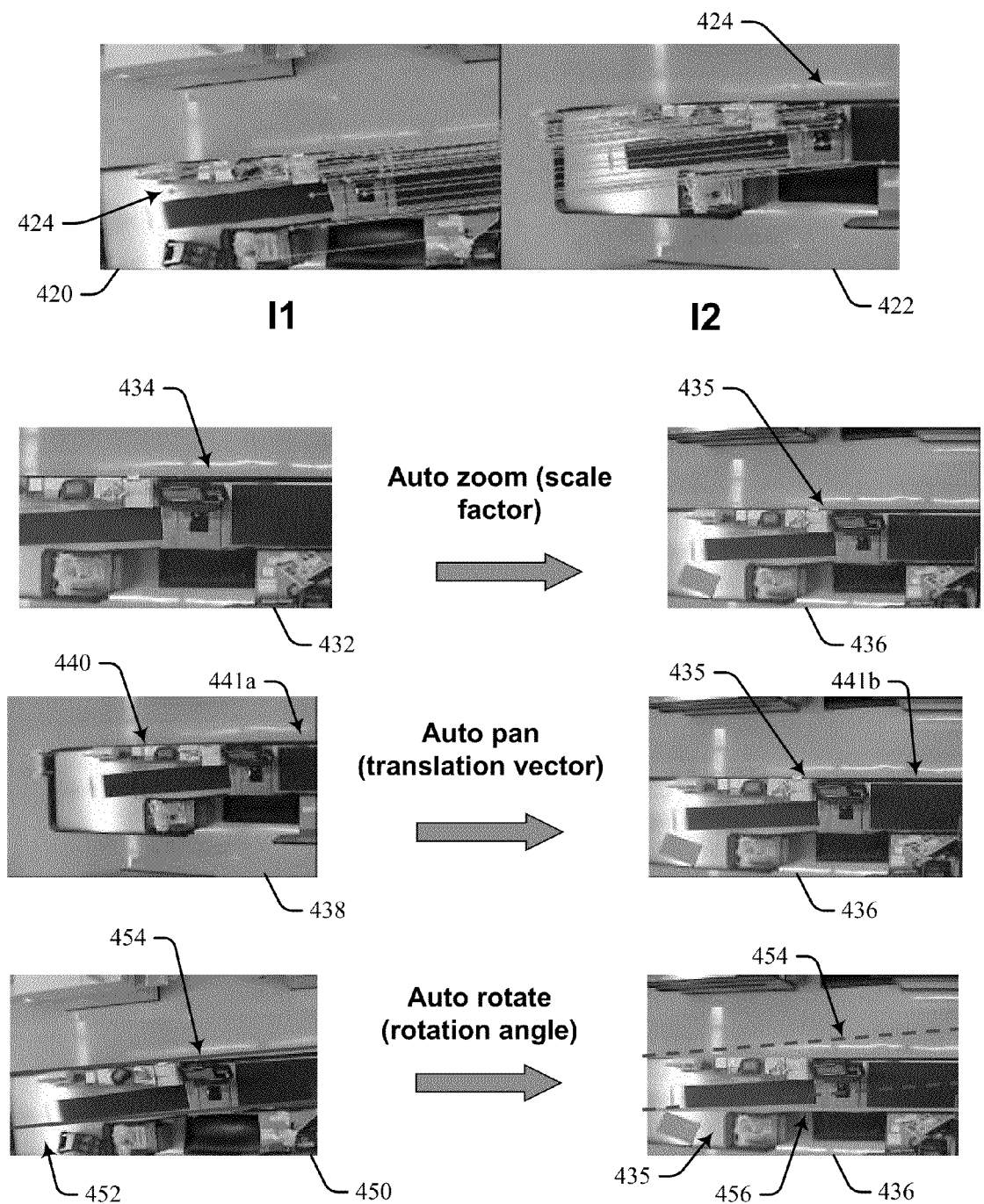
FIG. 5 illustrates exemplary pictorial camera images relative to an embodiment of the present invention.

FIG. 5 illustrates example camera images relative to the retail scanning example of FIG. 1. Given an example image I1 420 captured from an optimally configured camera, for each new image I2 422 captured by a new camera respective feature points 424 are detected from I1 and I2 and robust feature point matching is performed (at 404, FIG. 4). Some embodiment use RANSAC or "RANdom SAmple Consensus," an iterative method for estimating parameters of a mathematical model from a set of observed data containing outliers, though other techniques may be practiced. Thus, a 3×3 transformation matrix H may be determined (at 406, FIG. 4) such that:

$$P'_b = H \cdot P_a = [xp_b w, yp_b w, w] \quad [2]$$

$$P_b = \frac{P'_b}{w} = [xp_b, yp_b, 1]$$

The transformation matrix H may be decomposed into a chain of transformations for scaling ($H_s$), panning translation ($H_t$) and rotation ($H_r$): $H = H_r H_t H_s$, with the respective decomposed transformations applied to repose the new camera at 408, FIG. 4. Thus, referring to FIG. 5, the lens zoom setting of a new camera capturing the image 432 depicts a checkout area at a first zoom or scale level 434, which may be adjusted by the scaling ($H_s$) transformation to a new zoom setting to capture now a checkout area image 435 at a revised, zoomed-out scale level of the input optimized image 436. A camera capturing an image 438 depicting a checkout area 440 provides only a partial view 441a of a right-most, conveyer belt pick-up area (corresponding to the drop area region of interest 164 of FIG. 1), with a remainder off-screen, may be reposed by panning the camera rightward by the panning translation ($H_t$) transformation to a panning position which now generates the scene image 435 of the input optimized image 436 comprising a revised view 441b wherein the entire pick-up area is now visible. Another image 450 captured by a camera depicts a checkout area 452 aligned generally along parallel direction vectors 454 that are rotated out of alignment with the directional vectors 456 aligned with the checkout area 435 in the input optimized image 436; the camera acquiring this image 450 is accordingly rotated by the rotation ($H_r$) transformation to generate the scene image 435 of the input optimized image 436.

It will be appreciated that embodiments of the present invention are not limited to the examples described thus far with respect to retail scanner applications, but that they may be utilized in a variety of other applications using video data to monitor human activities. For example, video data may comprise human movements matched to turnstile admissions, badge or card swipes from an automated door lock, ticket kiosk, etc. Vehicles detected in relation to transit points and fare or pass data entry points, etc. Other data may also be considered, such as business transaction logs, retail receipts, injury reports, etc.

Figure 6:
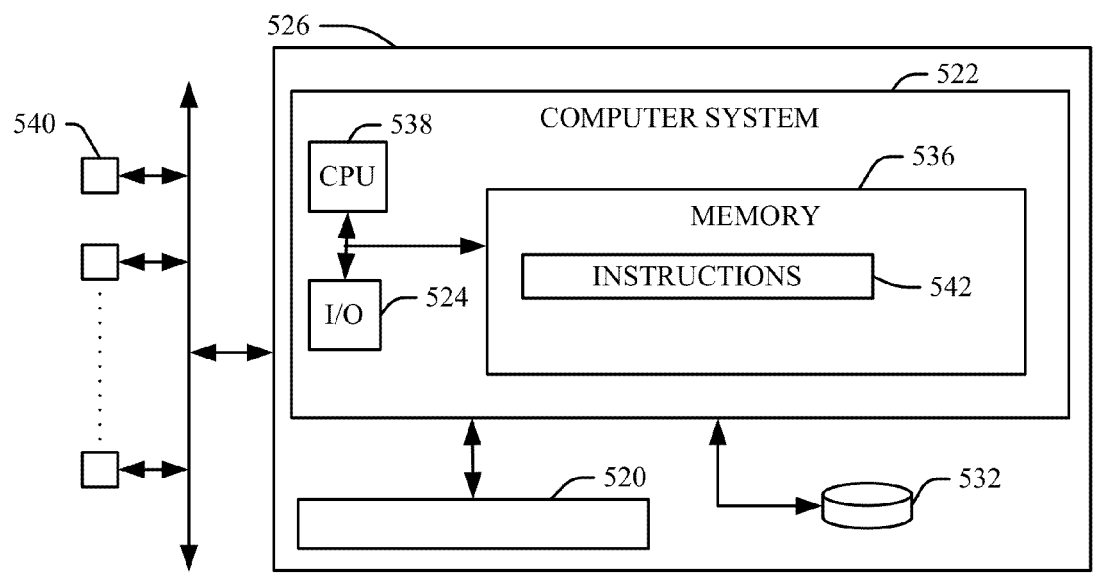
FIG. 6 is a block diagram of a computerized implementation of an embodiment of the present invention.

Referring now to FIG. 6, an exemplary computerized implementation of an embodiment of the present invention includes computer or other programmable device 522 in communication with other devices 540 (for example, video cameras or video servers, or memory devices comprising a database of images, etc.). Instructions 542 reside within computer readable code in a computer readable memory 536, or in a computer readable storage system 532, another device 540 or other computer readable storage medium that is accessed through a computer network infrastructure 526 by a processing unit (CPU) 538. Thus, the instructions, when implemented by the processing unit (CPU) 538, cause the processing unit (CPU) 538 to adjust camera settings as a function of associated video analytics data output as described above with respect to FIGS. 1 through 5.

Figure 7:
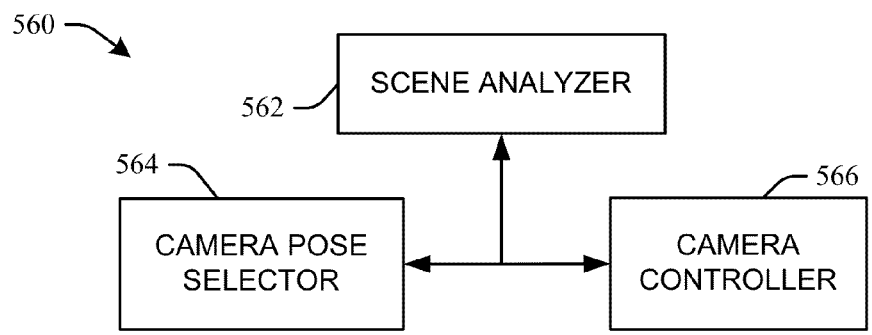
FIG. 7 is a block diagram of an article according to an embodiment of the present invention.

FIG. 7 illustrates an article 560 (for example, a programmable device, system, etc.) according to the present invention that classifies events through string pattern recognition as described above with respect to FIGS. 1 through 6. One or more of the components of the article 560 are tangible devices that perform specific functions, for example comprising the processing unit 538, the computer readable memory 536 and the computer readable storage medium 532 described above. Thus, as understood by reference to FIGS. 1-6 and the associated description material above, a Scene Analyzer 562 evaluates a camera pose by comparing transaction occurrences predicted through analysis of scene images acquired in the pose to actual transaction data to generate a performance value for pose as a function of a difference between the expected and predicted transaction data occurrences. A Camera Pose Selector 564 thus chooses an optimum pose from a plurality of poses iteratively analyzed by the Scene Analyzer 562 that has a best performance value, and a Camera Controller 566 moves the camera into the optimum pose/position for use in monitoring the scene and generating the primitives of interest associated with the transactions.

Embodiments of the present invention may also perform process steps of the invention on a subscription, advertising, and/or fee basis. That is, a service provider could offer to learn detectors and/or find detected objects in video data as a function of semantic attributes including motion direction as described above with respect to FIGS. 1-7. Thus, the service provider can create, maintain, and support, etc., a computer infrastructure, such as the network computer system 522, network environment 526, and/or the article 560 (or parts thereof) that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computers/devices 522, from a computer-readable medium device 536, 520 or 540; (2) adding one or more computing devices to a computer infrastructure; and (3) incorporating and/or modifying one or more existing systems of the computer infrastructure to enable the computer infrastructure to perform the process steps of the invention.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

What is claimed is:

1. A method for adjusting camera settings as a function of associated video analytics data output, the method comprising:

analyzing by a processing unit visual content captured from a scene by a camera in an initial pose setting to determine a predicted occurrence of a transaction associated with the visual content;

comparing by the processing unit the predicted transaction occurrence to data of actual transactions associated with the visual content to generate a performance value for the initial pose as a function of a difference between the predicted transaction and an actual transaction in the data of actual occurrences;

iteratively repeating, for each of at least one more different pose positions, the analyzing by the processing unit visual content captured from each scene by the camera in each of the at least one more pose settings to determine predicted occurrences of transactions associated with the visual content, and the comparing by the processing unit the each predicted transaction occurrences to the data of actual transactions associated with the visual content to generate performance values for each of the at least one more poses as the function of differences between the each predicted transactions and actual transactions in the data; and choosing by the processing unit an optimized pose from the initial and at least one more different camera poses that has the best performance value, wherein a camera controller may place the camera in the optimum pose for use in monitoring the scene and generating the primitives of interest associated with the transactions.

2. The method of claim 1, further comprising:

selecting the initial pose as a sample drawn randomly from a proposal probability distribution over a state space of all possible camera poses; and iteratively updating the proposal distribution as a function of each of the determined performance values of each of different samples for each of the different at least one more poses until reaching a stationary distribution approximately converging to the best performance value of the optimum pose.

3. The method of claim 2, wherein each of the state space samples comprise four-dimensional vector values S, Tx, Ty, and Alpha; and wherein each of the performance values are objective function distances from transaction occurrences predicted by video analytics for each pose to the actual occurrences in the actual transaction data.

4. The method of claim 3, wherein the step of iteratively updating the proposal distribution further comprises iteratively:

drawing samples from a current proposal distribution;

updating importance weights up to a normalizing constant using the objective function;

creating a new set of samples using their updated importance weights;
setting the updated importance weights of the drawn samples to uniform; and
updating the proposal distribution.

5. The method of claim 4, wherein the pose settings each comprise panning angle and zoom factor values, the method further comprising:
   detecting feature points in an image acquired from the camera in a first pose;
   comparing feature points in an example image to the feature points detected in the image acquired from the camera in the first pose via an image registration technique;
   finding transformation values for at least one of the panning angle and zoom factor values of the pose settings of the first pose as a function of the comparing the feature points to yield an image by the camera that is close to the example image; and
   applying the found transformation values to the first pose setting to move the camera into the initial position.

6. The method of claim 5, wherein the steps of finding the transformation values for the first pose and the applying the found transformation values to move the camera into the initial position further comprise at least one of the steps of:
   determining a scaling transformation value and adjusting a zoom setting of the camera first pose into another, different zoom setting in the initial position as a function of the determined scaling transformation value;
   determining a panning translation transformation value and panning the camera from the first pose into a different panning position in the initial position as a function of the determined panning translation transformation value; and
   determining a rotation transformation value and rotating the camera from the first pose into a different rotation position in the initial position as a function of the determined rotation transformation value.

7. A method of providing a service for classifying events through string pattern recognition, the method comprising:
   providing a scene analyzer that evaluates a camera pose by comparing transaction occurrences predicted through analysis of scene images acquired by the camera while in the pose to actual transaction data to generate a performance value for the pose as a function of a difference between the expected and predicted transaction data occurrences;
   providing a camera pose selector that chooses an optimum pose from a plurality of poses iteratively analyzed by the scene analyzer that has a best performance value;
   providing a camera controller that moves the camera into the optimum pose for use in monitoring the scene and generating primitive images of interest associated with the transactions.

8. The method of claim 7, wherein the camera pose selector further selects the initial pose as a sample drawn randomly from a proposal probability distribution over a state space of all possible camera poses; and
   the scene analyzer further iteratively updates the proposal distribution as a function of each of the determined performance values of each of different samples for each of the different at least one more poses until reaching a stationary distribution approximately converging to the best performance value of the optimum pose.

9. The method of claim 8, wherein each of the performance values are objective function distances from transaction occurrences predicted by video analytics for each pose to the actual occurrences in the actual transaction data.

10. The method of claim 9, wherein the scene analyzer further updates the proposal distribution by iteratively:
    drawing samples from a current proposal distribution;
    updating importance weights up to a normalizing constant using the objective function;
    creating a new set of samples using their updated importance weights;
    setting the updated importance weights of the drawn samples to uniform; and
    updating the proposal distribution.

11. The method of claim 10, wherein the pose settings each comprise panning angle and zoom factor values, and wherein the scene analyzer further:
    detects feature points in an image acquired from the camera in a first pose;
    compares feature points in an example image to the feature points detected in the image acquired from the camera in the first pose via an image registration technique;
    finds transformation values for at least one of the panning angle and zoom factor values of the pose settings of the first pose as a function of the comparing the feature points to yield an image by the camera that is close to the example image; and
    applies the found transformation values to the first pose setting to move the camera into the initial position.

12. The method of claim 11, wherein the steps of finding the transformation values for the first pose and the applying the found transformation values to move the camera into the initial position further comprise at least one of the steps of:
    the scene analyzer determining a scaling transformation value and the camera pose selector adjusting a zoom setting of the camera first pose into another, different zoom setting in the initial position as a function of the determined scaling transformation value;
    the scene analyzer determining a panning translation transformation value and the camera pose selector panning the camera from the first pose into a different panning position in the initial position as a function of the determined panning translation transformation value; and
    the scene analyzer determining a rotation transformation value and the camera pose selector rotating the camera from the first pose into a different rotation position in the initial position as a function of the determined rotation transformation value.

13. A system, comprising:
    a processing unit;
    a computer readable memory; and
    a computer-readable storage medium;
    wherein the processing unit, when executing program instructions stored on the computer-readable storage medium via the computer readable memory:
    evaluates a camera pose by comparing transaction occurrences predicted through analysis of scene images acquired by the camera while in the pose to actual transaction data to generate a performance value for the pose as a function of a difference between the expected and predicted transaction data occurrences;
    chooses an optimum pose from a plurality of iteratively analyzed poses that has a best performance value; and
    moves the camera into the optimum pose for use in monitoring the scene and generating primitive images of interest associated with the transactions.

14. The system of claim 13, wherein the processing unit, when executing the program instructions stored on the computer-readable storage medium via the computer readable memory, further:

selects the initial pose as a sample drawn randomly from a proposal probability distribution over a state space of all possible camera poses; and iteratively updates the proposal distribution as a function of each of the determined performance values of each of different samples for each of the different at least one more poses until reaching a stationary distribution approximately converging to the best performance value of the optimum pose.

15. The system of claim 14, wherein each of the performance values are objective function distances from transaction occurrences predicted by video analytics for each pose to the actual occurrences in the actual transaction data.

16. The system of claim 15, wherein the processing unit, when executing the program instructions stored on the computer-readable storage medium via the computer readable memory, further updates the proposal distribution by iteratively:

drawing samples from a current proposal distribution;
updating importance weights up to a normalizing constant using the objective function;
creating a new set of samples using their updated importance weights;
setting the updated importance weights of the drawn samples to uniform; and
updating the proposal distribution.

17. The system of claim 16, wherein the pose settings each comprise panning angle and zoom factor values, and wherein the processing unit, when executing the program instructions stored on the computer-readable storage medium via the computer readable memory, further:

detects feature points in an image acquired from the camera in a first pose;
compares feature points in an example image to the feature points detected in the image acquired from the camera in the first pose via an image registration technique;
finds transformation values for at least one of the panning angle and zoom factor values of the pose settings of the first pose as a function of the comparing the feature points to yield an image by the camera that is close to the example image; and
applies the found transformation values to the first pose setting to move the camera into the initial position.

18. The system of claim 17, wherein the processing unit, when executing the program instructions stored on the computer-readable storage medium via the computer readable memory, further finds the transformation values for the first pose and applies the found transformation values to move the camera into the initial position by at least one of:

determining a scaling transformation value and adjusting a zoom setting of the camera first pose into another, different zoom setting in the initial position as a function of the determined scaling transformation value;
determining a panning translation transformation value and panning the camera from the first pose into a different panning position in the initial position as a function of the determined panning translation transformation value; and
determining a rotation transformation value and rotating the camera from the first pose into a different rotation position in the initial position as a function of the determined rotation transformation value.

19. An article of manufacture, comprising:

a tangible computer readable storage hardware device having computer readable program code embodied therewith, the computer readable program code comprising instructions that, when executed by a computer processor, cause the computer processor to:

evaluate a camera pose by comparing transaction occurrences predicted through analysis of scene images acquired by the camera while in the pose to actual transaction data to generate a performance value for the pose as a function of a difference between the expected and predicted transaction data occurrences;
choose an optimum pose from a plurality of iteratively analyzed poses that has a best performance value; and
move the camera into the optimum pose for use in monitoring the scene and generating primitive images of interest associated with the transactions.

20. The article of manufacture of claim 19, wherein the computer readable program code instructions, when executed by the computer processor, further cause the computer processor to:

select the initial pose as a sample drawn randomly from a proposal probability distribution over a state space of all possible camera poses; and
iteratively update the proposal distribution as a function of each of the determined performance values of each of different samples for each of the different at least one more poses until reaching a stationary distribution approximately converging to the best performance value of the optimum pose.

21. The article of manufacture of claim 20, wherein each of the performance values are objective function distances from transaction occurrences predicted by video analytics for each pose to the actual occurrences in the actual transaction data.

22. The article of manufacture of claim 21, wherein the computer readable program code instructions, when executed by the computer processor, further cause the computer processor to update the proposal distribution by iteratively:

drawing samples from a current proposal distribution;
updating importance weights up to a normalizing constant using the objective function;
creating a new set of samples using their updated importance weights;
setting the updated importance weights of the drawn samples to uniform; and
updating the proposal distribution.

23. The article of manufacture of claim 22, wherein the pose settings each comprise panning angle and zoom factor values, and wherein the computer readable program code instructions, when executed by the computer processor, further cause the computer processor to:

detect feature points in an image acquired from the camera in a first pose;
compare feature points in an example image to the feature points detected in the image acquired from the camera in the first pose via an image registration technique;
find transformation values for at least one of the panning angle and zoom factor values of the pose settings of the first pose as a function of the comparing the feature points to yield an image by the camera that is close to the example image; and
apply the found transformation values to the first pose setting to move the camera into the initial position.

24. The article of manufacture of claim 23, wherein the computer readable program code instructions, when executed by the computer processor, further cause the computer processor to find the transformation values for the first pose and apply the found transformation values to move the camera into the initial position by at least one of:

determining a scaling transformation value and adjusting a zoom setting of the camera first pose into another, different zoom setting in the initial position as a function of the determined scaling transformation value;

determining a panning translation transformation value and panning the camera from the first pose into a different panning position in the initial position as a function of the determined panning translation transformation value; and determining a rotation transformation value and rotating the camera from the first pose into a different rotation position in the initial position as a function of the determined rotation transformation value.

* * * * *